(12) United States Patent
Fankhauser et al.

(10) Patent No.: US 9,212,013 B2
(45) Date of Patent: Dec. 15, 2015

(54) OVERHEAD-CONVEYING TRANSPORT BAG AND METHOD FOR AUTOMATICALLY UNLOADING THE TRANSPORT BAG

(71) Applicant: SSI SCHAEFER PEEM GMBH, Graz (AU)

(72) Inventors: Robert Fankhauser, Dobl (AU); Christoph Grossl, Graz (AU); Max Winkler, Graz (AU)

(73) Assignee: SSI SCHÄFER PEEM GMBH, Graz (AT)

( * ) Notice: Subject to any disclaimer, the term of this patent is extended or adjusted under 35 U.S.C. 154(b) by 7 days.

(21) Appl. No.: 14/028,683

(22) Filed: Sep. 17, 2013

(65) Prior Publication Data

US 2014/0086713 A1 Mar. 27, 2014

Related U.S. Application Data

(63) Continuation of application No. PCT/EP2012/054636, filed on Mar. 16, 2012.

(30) Foreign Application Priority Data

Mar. 17, 2011 (DE) .......................... 10 2011 015 138

(51) Int. Cl.
*B65G 9/00* (2006.01)
*B65G 65/00* (2006.01)
(Continued)

(52) U.S. Cl.
CPC ................ *B65G 65/00* (2013.01); *B65G 9/002* (2013.01); *B65G 9/004* (2013.01); *B65G 47/61* (2013.01); *B65G 17/20* (2013.01)

(58) Field of Classification Search
CPC .................. B65G 2201/0229; B65G 49/0463; B65G 49/049; B65G 65/00; B65G 9/002; B65G 9/004; B65G 47/61; B65G 19/025; B65G 17/20
USPC ............ 198/717, 597, 644, 463.3; 209/3, 3.3, 209/584, 702, 702.3, 916; 414/222.01, 414/222.1, 222.02, 222.03, 416.09, 479.1, 414/612, 626, 630, 659, 661, 662, 674, 785, 414/814, 806
See application file for complete search history.

(56) References Cited

U.S. PATENT DOCUMENTS 3,469,288 A 9/1969 Schaeffer
3,854,573 A 12/1974 Freier, Sr.
(Continued)

FOREIGN PATENT DOCUMENTS

DE 948 322 B 3/1954
DE 975 464 B 12/1956
(Continued)

OTHER PUBLICATIONS

International Search Report for corresponding Application No. PCT/EP2012/054636 dated Jun. 12, 2012.
(Continued)

*Primary Examiner* — Saul Rodriguez
*Assistant Examiner* — Ronald Jarrett
(74) *Attorney, Agent, or Firm* — Renner, Otto, Boisselle & Sklar, LLP (57) ABSTRACT

An overhead-conveying transport bag for automatically unloading a loaded piece good includes a basic structure as well as a separate receiving device, which is arranged adjacent thereto. Unloading of the transport bag is performed through one of the front sides of the basic structure which is open and at least the lateral sides of the receiving device are formed such that the base is liftable into an unloading position of the transport bag, in which the base is lifted into the bottom of the basic structure.

19 Claims, 8 Drawing Sheets

(51) Int. Cl.
  *B65G 47/61* (2006.01)
  *B65G 17/20* (2006.01)

(56) References Cited

U.S. PATENT DOCUMENTS

| 3,863,789 | A | * | 2/1975 | Hunter et al. ............... 414/421 |
| 6,085,914 | A | * | 7/2000 | Tobaccowala et al. ....... 209/702 |
| 6,679,378 | B1 | | 1/2004 | Vermeulen et al. |
| 6,851,913 | B2 | | 2/2005 | Iizuka |

FOREIGN PATENT DOCUMENTS

| DE | 1 287 508 | | 1/1969 |
| DE | 196 23 002 | A1 | 12/1997 |
| DE | 198 57 575 | A1 | 6/2000 |
| DE | 102 16 064 | A1 | 11/2003 |
| DE | 10 2004 018 569 | A1 | 11/2005 |
| DE | 10 2006 036 095 | A1 | 3/2007 |
| DE | 10 2008 061 685 | A1 | 6/2010 |
| EP | 2 418 160 | A1 | 2/2012 |
| FR | 2 776 624 | A1 | 10/1999 |

OTHER PUBLICATIONS

Written Opinion for corresponding Application No. PCT/EP2012/054636 dated Jun. 12, 2012.
International Preliminary Report on Patentability for corresponding Application No. PCT/EP2012/054636 dated Sep. 17, 2013.
Translation of Search Report for corresponding German Application No. 10 2011 015 138.9 dated Feb. 5, 2013.

* cited by examiner

OVERHEAD-CONVEYING TRANSPORT BAG AND METHOD FOR AUTOMATICALLY UNLOADING THE TRANSPORT BAG

CROSS REFERENCE TO RELATED APPLICATIONS

This is a continuation application of the international application WO 2012/123564 A1 (PCT/EP2012/054636), filed on Mar. 16, 2012, which international application claims priority of the German patent application DE 10 2011 015 138.9, filed on Mar. 17, 2011. Both priority applications are fully incorporated by reference herewith.

BACKGROUND OF THE INVENTION

The present invention relates to a new overhead-conveying transport bag for automatically unloading a loaded piece good, to an overhead-conveying system as well as to a method for automatically unloading.

RELATED PRIOR ART

The German patent application DE 10 2008 061 685 A1 discloses a transport bag of an overhead-conveying system, which is loaded automatically by means of a loading station. The transport bag comprises a stable support wall and a base-side wall, wherein the base-side wall is made of a flexible material, e.g. of a stable fabric or a stable web. The support wall, which is intrinsic rigid, comprises a support frame. The transport bag is open laterally.

A drawback of the transport bag is to be seen in that the loaded piece goods can drop laterally during travel through the conveying system. Another drawback is to be seen in that the transport bags cannot be unloaded automatically. Unloading is conducted by rotating the transport bag upside down so that the loaded piece good falls out of an opening, which is defined by a circumferential handle in the top side of the transport bag. Under certain circumstances, the piece goods can be damaged due to the fall.

The document DE 10 2004 018 569 A1 discloses a collecting device for collecting objects in a sorting manner, as well as a conveying device for transporting the collecting device.

The document DE 128 087 discloses a transport bag of letter-sorting machines.

Therefore, it is an object of the present invention to provide a transport bag which can unload piece goods, which are loaded, automatically and without damage and in which loaded piece goods are transportable in a captive manner.

SUMMARY OF THE INVENTION

According to a first aspect of the invention it is disclosed an overhead-conveying transport bag for automatically unloading a loaded piece good comprising a basic structure as well as a separate receiving device, which is arranged adjacent thereto; wherein the basic structure comprises a top side, a bottom, lateral sides, and front sides; wherein the receiving device comprises a base, a top side, front sides, and lateral sides; wherein the unloading of the transport bag is performed through one of the front sides of the basic structure which is open, wherein an opposite front side preferably is open as well; wherein the bottom of the basic structure couples to the top side of the receiving device for defining a receiving space beneath the basic structure, and wherein the bottom of the basic structure, in particular in a non-loaded state (FIG. 1) of the transport bag, is open, wherein the top side of the receiving device is open in the non-loaded state of the transport bag; wherein at least the lateral sides of the basic structure, the lateral sides of the receiving device, and the base of the receiving device are closed; and wherein at least the lateral sides of the receiving device are formed such that the base is liftable into an unloading position (FIG. 2B) of the transport bag, in which the base is lifted into the bottom of the basic structure, characterized in that the transport bag respectively comprises a retaining device extending in the region of the front sides at least along a transition between the basic structure and the receiving device. The lateral sides of the receiving device can be flexible.

The retaining device prevents that the loaded piece goods can laterally fall out of the transport bag while the transport bag is transported along the overhead conveyor. As soon as the transport bag has reached an unloading point, the receiving device, or the base thereof, can be lifted such that a pusher can be inserted laterally into the bag for horizontally pushing out the piece good. Hence, the piece good does not fall, but is unloaded "softly". Thereby, the piece good cannot be damaged. The transport is safe.

In this manner, an automatic unloading is basically possible. Manual action is required only in case of additional working steps (packaging, labeling, etc.). Preferably, target containers (also cartons, trays, palettes, etc.) can be loaded directly without the need to use human work force.

With a preferred embodiment, the basic structure is a parallelepiped, and preferably even an ashlar or cube. If a parallelepiped is selected for the basic structure a frame for the basic structure can be constructed easily, which in turn ensures the stability of shape of the basic structure. In particular, the stability of shape can be important for the unloading process, since the pusher interacts with the cross section of the basic structure in this case. For achieving high efficiency, the cross section of the pusher is substantially selected as big as the cross section of the basic structure into which the pusher is inserted.

Further, it is advantageous to form the bag such that a cross section of the basic structure along the front sides remains unchanged during a transport process and an unloading process.

With another preferred embodiment, the front sides of the receiving device are closed. The front sides can be additionally flexible.

In this case, the front sides of the receiving device are also part of the retaining device and prevent an unintentional lateral unloading of the bag, in particular during a transport of the bag through an overhead-conveying system.

In particular, closed sides of the transport bag are covered by a fabric.

The wrapping of the basic structure of the receiving device in a circumferential direction by a length of material can be handled without bigger technical efforts. The circumferential wrapping prevents falling of the piece goods while the transport bag is moved within the overhead-conveying system.

Preferably, the base of the receiving device is formed of a rigid material. In this case, the base is plane and ensures in this manner that the to-be-unloaded piece good stands on a flat area, if the base of the receiving device is lifted by the lifting device through the unloading position. In this case, the to-be-unloaded piece good is located at the level of the base of the basic structure and can leave the interior 35 of the basic structure without collision, i.e. there is no collision between the to-be-unloaded piece good and the retaining device.

In this context, it is particularly advantageous if the area of the base substantially equals the area of the base of the basic structure.

If both of the areas substantially have the same size, i.e. if they are congruent, the to-be-unloaded piece good cannot get jammed in a gap between the base and the bottom of the basic structure, and thus prevents an automatic unloading.

With another preferred embodiment, at least lower edges of the front sides of the basic structure, or upper edges of the front sides of the receiving device, respectively are defined by a strut, preferably by a wire strut or carbon strut.

In this case, the front sides of the receiving device are open. Lateral falling is only prevented by the struts. The weight of the bag is reduced thereby. Thereby, the manufacturing of the bag is facilitated.

Further, it is preferred that at least all of the edges of the basic structure are defined by struts being connected to each other, which define a frame, which is preferably covered by a material, such that the material surrounds, in terms of a length of material, the top side of the basic structure, the lateral sides of the basic structure, the lateral sides of the receiving device and the base of the receiving device, and such that the material sags in the region of the receiving device in a non-loaded state of the transport bag.

Further, according to a second aspect it is disclosed an overhead-conveying system comprising: a transport bag in accordance with one of the preceding claims; and an unloading station; wherein the unloading station comprises a lifting device and a pushing device; wherein the lifting device is configured to lift the base of the receiving device of the transport bag, which is loaded with at least one piece good if the transport bag is located in an unloading position, in a vertical direction such that the at least one piece good can be pushed out horizontally by means of the pushing device through one of the front sides of the basic structure of the transport bag; and wherein the pushing device comprises a pusher which engages an interior of the basic structure, where the at least one piece good is located if the base is lifted, through the other front side of the basic structure.

Further, it is advantageous if the unloading station further comprises at least one fixing device.

The fixing device can fix the transport bag in the unloading position such that the pusher can be inserted into the interior of the transport bag without collisions.

In another advantageous embodiment the overhead-conveying system further comprises a work station, which is arranged directly adjacent to the unloading station and which comprises a working surface, which is orientated horizontally and which is substantially flash-coupled to the bottom of the transport bag.

In this manner it is prevented that the unloaded piece goods fall out of the bag. The piece goods are laterally pushed in a "soft" manner and are not damaged due to the automatic unloading.

In particular, the overhead-conveying system can comprise a target location, where an order-load support can be positioned such that an upper opening edge of the order-load support is substantially flush-coupled to the bottom of the transport bag.

Further, it is advantageous if the target location is part of a conveying system, which transports the order-load support.

Finally, according to third aspect it is disclosed by a method for automatically unloading an overhead-conveying transport bag, comprising the steps of: positioning the transport bag, which is loaded with at least one piece good, in an unloading position; automatically lifting a receiving device of the transport bag by means of a lifting device such that a base of the receiving device is located at a height of an open bottom of a basic structure of the transport bag; and automatically pushing the at least one piece good out of the transport bag by means of a pushing device in that a pusher of the pushing device is inserted through a front side of the basic structure into an interior of the basic structure and laterally pushes out the at least one piece good through an oppositely arranged open front side of the basic structure.

DESCRIPTION OF PREFERRED EMBODIMENTS

In the following description of the Figures, identical units, components, features, or the like will be designated by the identical reference numerals. Modified objects will be designated by modified reference numerals.

Figure 1:
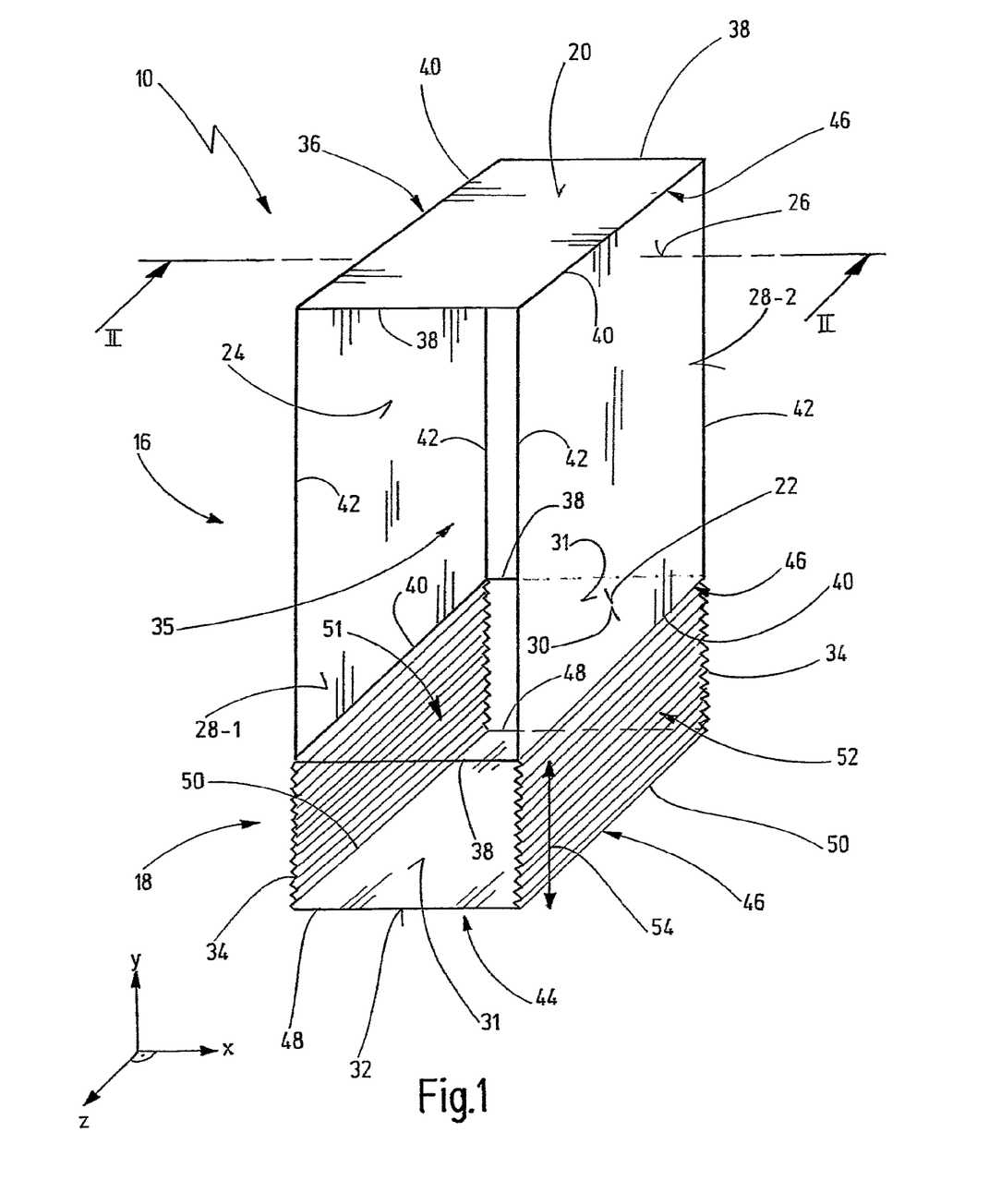
FIG. 1 shows a perspective view of a first embodiment of an overhead-conveying transport bag in accordance with the invention.

In FIG. 1 a first embodiment of an overhead-conveying transport bag 10 in accordance with the present invention is shown in a perspective view, which is transported along a longitudinal direction X and which is loaded and unloaded in a transversal direction Z. The overhead-conveying transport bag 10 is hereinafter also designated briefly as "transport bag 10" or "bag 10".

The transport bag 10 comprises a (not shown) mounting device 12, for example a (not shown) hook 14. Further, the transport bag 10 comprises a basic structure 16 and a receiving device 18 arranged adjacent thereto.

The basic structure 16 comprises a top side 20, a bottom 22, a frontal front side 24, a rear front side 26, as well as lateral sides 28. The receiving device 18 comprises a top side 30, front sides 31, a base 32, as well as lateral sides 34.

Preferably, the basic structure 16 has the shape of a parallelepiped. A parallelepiped represents a geometrical structure which is limited by six congruent (identical) parallelograms in a pairwise manner, which are arranged in parallel planes. The parallelepiped has 12 edges, respectively four of which are extending in parallel and have the same length. An ashlar and a cube are special shapes of the parallelepiped. In FIG. 1, an ashlar is exemplarily shown for both the basic structure 16 and the receiving device 18.

An interior 35 of the basic structure 16 substantially corresponds to the volume of the ashlar of the basic structure 16.

The edges of the basic structure 16 can be defined by short horizontal struts 38 and long horizontal struts 40 in the region of the top side 20 and/or the bottom 22, which are connected to each other at least in the horizontal plane (XZ). Further, vertically orientated edges of the basic structure 16 can be realized by vertical struts 42 defining a rigid (basic) frame 36, if all of the struts 38 to 42 are connected to each other. The frame 36 can be formed, for example, in terms of a wire frame or a carbon frame.

The receiving device 18 can additionally, or alternatively, comprise a plate 44, which is preferably continuously plane, as a base 32. Alternatively, the base 32 can be formed by a frame 46, which can be formed by short struts 48 along the front sides 31, and long struts 50, which are connected thereto, along the lateral sides 34. The top side 30 of the receiving device 18 preferably is congruent to the bottom 22 of the basic structure 16 and preferably is substantially congruent to the base 32 of the receiving device 18.

In FIG. 1, the transport bag 10 is shown in a non-loaded state. The receiving device 18 defines in the non-loaded state of the bag 10 a separate receiving space 51 beneath the basic structure 16, which is not formed by a sagging base of the basic structure 16. The base, and the bottom respectively, of the basic structure 16 are open. The lateral sides 34 of the receiving device 18 can be formed in terms of the bellow 52 for allowing to compress and tear apart the lateral sides 34 along the vertical direction Y, as indicated by means of a double arrow 54 in FIG. 1.

The lateral side wall 28-1, which is depicted at the left in FIG. 1, and the lateral side wall 28-2, which is depicted at the right of FIG. 1, of the basic structure 16 are preferably closed for preventing a loading good from falling out of the transport bag 10 in the longitudinal direction X, if the bag 10 is in a loaded state. Typically, the transport bag 10 is transported in the longitudinal direction X along the overhead conveyor. The lateral sides 34 and the base 32 of the receiving device 18 are also closed. Preferably, also the top side 20 of the basic structure 16 is closed.

A "closed" configuration means that the loading good, in a loaded state of the transport bag 10, cannot fall out of the transport bag 10 due to the transport movement. For example, in order to prevent the loading good from falling out in the transversal direction Z, at least along the connecting line (transition line) between the basic structure 16 and the receiving device 18 a retaining device is to be provided in the region of the front sides 24, 26, and 31. In FIG. 1, the receiving device is implemented by the short horizontal struts 38 of the bottom 22 of the basic structure 16. These short struts 38 prevent the loading good from falling out in the transversal direction Z at both the frontal front side 24 and the rear front side 26, even if the front sides 24, 26, and 31 are open, as will be hereinafter explained in more detail in the context of the FIGS. 2A and 2B.

Struts 38 and 40 which are arranged at the same level (without the vertical struts 42) as well as preferably the struts 48 and 50 can respectively form a rectangular frame 46. These frames 46 can be wrapped in a circumferential direction of the bag 10, i.e. externally around the front sides 24, 26, and 31, exemplarily by a length of material so that the front sides 24, 26 and 31 remain open. The total front sides, which result from the front sides 24 and 31, or 26 and 31, in this case are separated from each other only by the short struts 38 of the central frame 46. In this case, the base 32 can be supported additionally by a plate 44, which can be inserted into the lower frame 46 flatly.

Figure 2A:
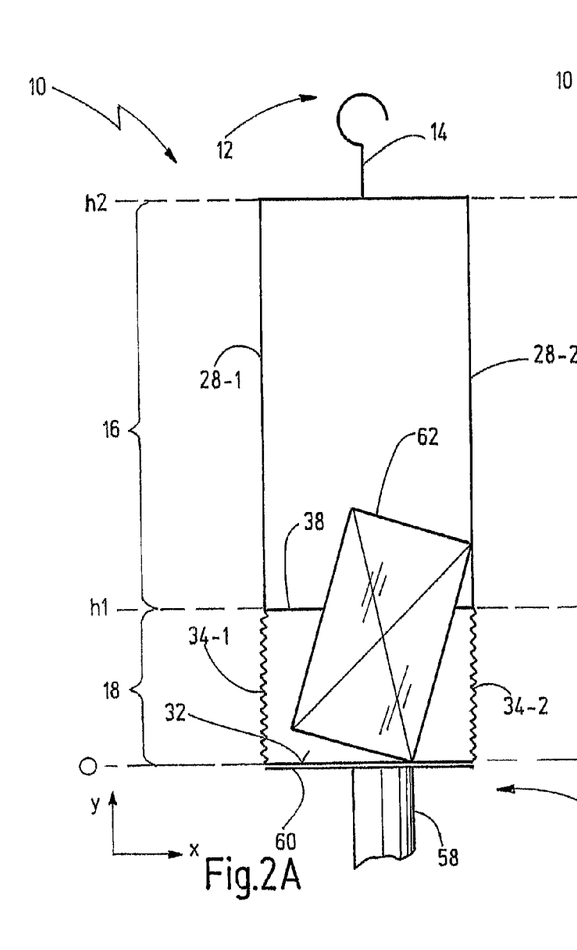
FIGS. 2A and 2B show sectional views of a loaded transport bag, which is formed in accordance with FIG. 1, along a line II-II of FIG. 1 in a transport position (FIG. 2A) and in an unloading position (FIG. 2B)
Figure 2B:
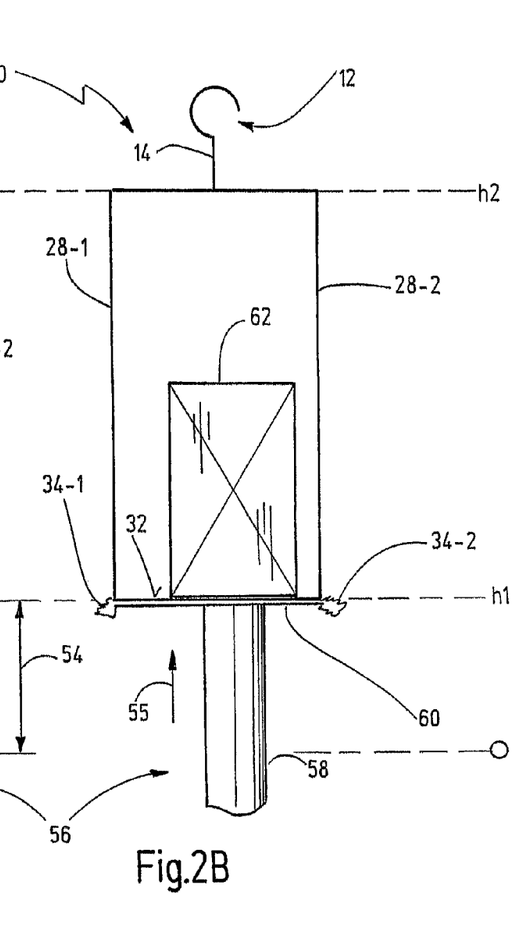

In the FIGS. 2A and 2B, sectional views are shown along a line II-II of FIG. 1 through a loaded transport bag 10, which is formed in accordance with FIG. 1. In FIG. 2A, the transport bag 10 is shown in a transport position. In FIG. 2B the transport bag 10 is shown in an unloading position. In FIGS. 2A and 2B, the transport bag 10 is shown comprising the mounting device 12 in terms of an exemplary hook 14.

Further, in the FIGS. 2A and 2B, respectively one lifting device 56 is shown, which can comprise, for example, a (lifting) cylinder 58 and a platform 60 for moving a piece good 62, which is loaded into the transport bag 10, in the vertical direction Y from the transport position of FIG. 2A into the unloading position of FIG. 2B, as indicated by means of an auxiliary arrow 55. The base 32 is moved from an—arbitrarily selected—height 0 to a height h1, at which the bottom 22 of the basic structure 16 is arranged. The transport bag 10 has a total height h2 in the transport position and a total height h2-h1 in the unloading position. In the unloading position of FIG. 2B, the to-be-unloaded piece good 62 stands flatly on the base 32. The platform 60 is preferably formed flatly, however it can also be formed, for example, in terms of a grid or a comb.

In the unloading position of FIG. 2B, the lateral sides 34-1 and 34-2 of the receiving device 18 are compressed and are hanging preferably laterally to the outside, as shown. The elongation of the lateral side walls 28-1 and 28-2 of the basic structure 16 is not influenced by the lifting movement 55, i.e. a cross section of the basic structure 16 in the vertical plane xy preferably remains unchanged, in order to allow an interaction of the transport bag 10 with a pushing device, which will be explained below, for laterally unloading the piece good 62 (i.e. through the front sides 24 or 26).

As long as the compressed lateral side walls 34-1 and 34-2 of the receiving device 18 are not colliding with the pushing device during a lateral unloading of the piece good 62, i.e. there is no collision, the compressed side walls 34-1 and 34-2 can also be facing, at least partially, the interior 35 of the basic structure 16.

Figure 3:
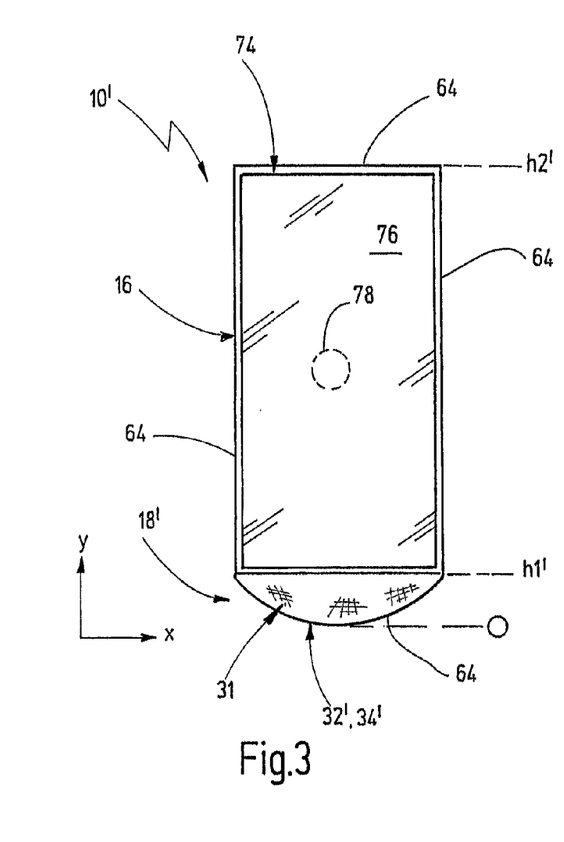
FIG. 3 shows a front view of another transport bag in accordance with the invention in a non-loaded state.

With reference to FIG. 3 a front side of another transport bag 10' in accordance with the present invention is shown. With the transport bag 10' the receiving device 18' is formed such that the front sides 31 preferably are closed and that the lateral side walls 34' thereof and the base 32' are arranged seamlessly adjacent to each other. This can be achieved by generally allowing the length of the material, which was mentioned in the context of FIG. 1, to sag in the non-loaded state of the bag 10' beneath the basic structure 16', which otherwise is typically pulled tightly over the bottom 22 of prior art transport bags. In this case, the receiving device 18' sags such that a piece good 62 cannot laterally fall out of the transport bag 10'. Typically, always only one piece good 62 is transported by a transport bag 10 or 10'.

Then, a lifting device 56 can move the loose flexible base 32', which preferably does not comprise a frame 46, to the level h1' of the bottom 22 of the basic structure 16, in particular if at least the receiving device 18' is formed by a fabric, or a material 64.

Figure 4:
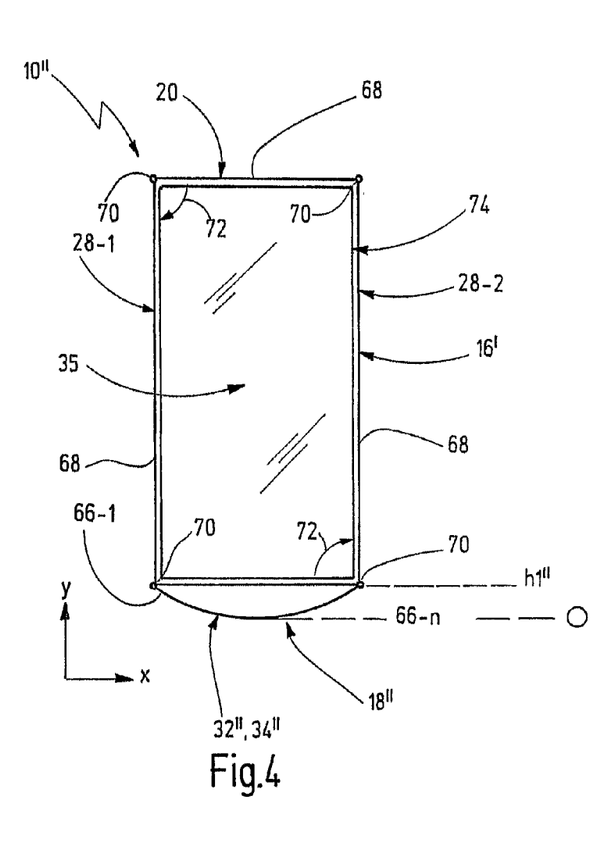
FIG. 4 shows a front view of still another transport bag in accordance with the invention in a non-loaded state.

With reference to FIG. 4, another embodiment of a transport bag 10" of the invention is shown.

The transport bag 10" is different to the transport bags 10' of FIGS. 1 and 2 as well as to the transport bag 10' of FIG. 3 in that the receiving device 18" is formed differently. In the present case, the receiving device 18" is formed by plate-like strips 66-1 to 66-n (n is an arbitrary integer), which are connected to each other along the transversal direction Z and which are foldable like a bellow, for example, in the longitudinal direction X if the (presently not shown) lifting device 56 is operated in the vertical direction Y.

Further, in FIGS. 3 and 4, respectively, one pushing device 74 is indicated, which can comprise a shield-like pusher 74, which in turn is movable in an oscillating manner by means of a pneumatically or hydraulically operated cylinder 78 in the transversal direction Z. The area of the pusher 76 preferably is substantially as large as the cross section of the basic structure 16 in the horizontal plane XY. The pusher 76 can be inserted into the interior 35 of the basic structure 16 of the transport bag 10, 10', or 10" from the rear front side 26 if it is located in the unloading position, i.e. if the lifting device 56 has lifted the base 32, 32', or 32" to the level of the bottom 22 of the basic structure 16. In this case, the piece good 62 can be pushed out—without collision—through the frontal front side 24 (cf. FIG. 1), namely in a horizontal direction, wherein the piece good 62 does not fall in the direction Y, as it will be explained in more detail below. As a matter of fact, the unloading process can also be conducted in the inverted direction. The selection of the direction Z as the unloading direction is purely arbitrary and could be replaced by any other orientation.

Figure 5:
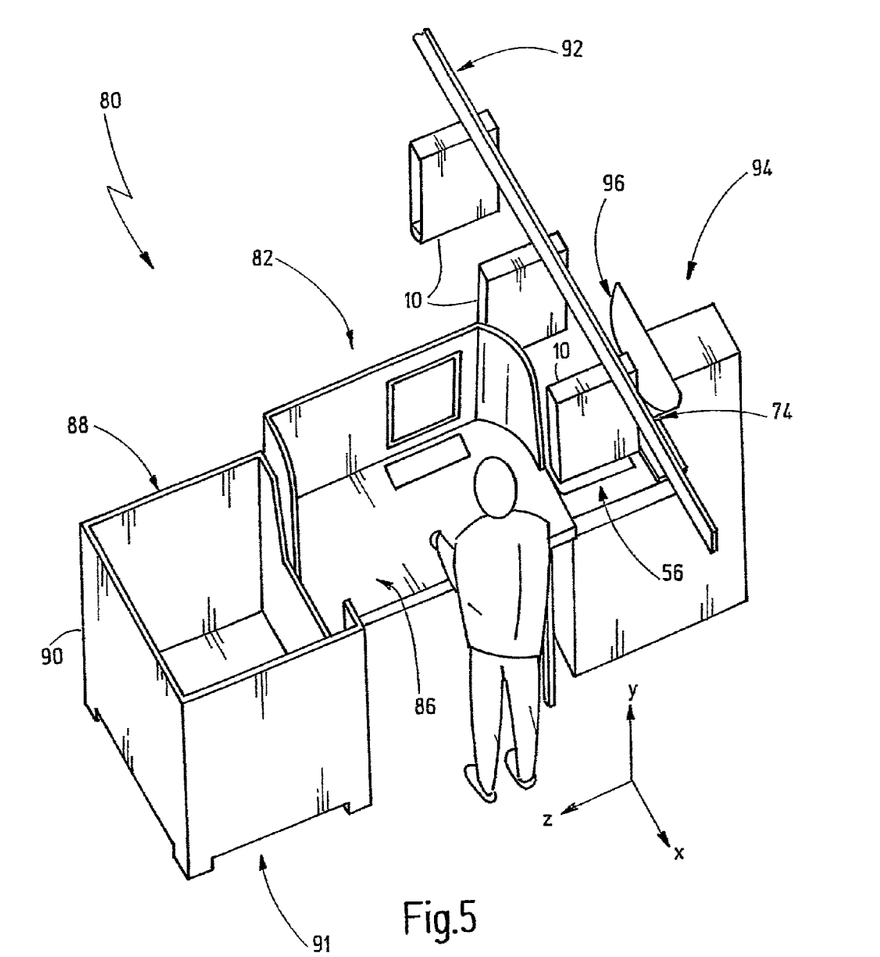
FIG. 5 shows a perspective view of an overhead-conveying system in accordance with the invention.

In FIG. 5, a perspective view of an overhead-conveying system 80 having a (manual) work station 82 is shown, where an operator 84 can work at a working surface 86, which is preferably arranged hip-high.

In FIG. 5, an order-load support 88 such as a container 90 is additionally shown at a target location 91, which is arranged directly adjacent to the work station 82. The work station 82 is arranged directly adjacent to an unloading station 94, which is supplied with transport bags 10 of the above-described type by means of an (overhead conveying) rail system 92.

The unloading station 94 can comprise one or more fixing devices 96 for retaining the transport bags 10 during an unloading process in a predetermined position. The unloading station 94 comprises a lifting device 56 and a pushing device 74. The lifting device 56 acts along the vertical direction (direction Y). The pushing device 74 acts along the horizontal direction (e.g. transversal direction Z), as described above.

The work station 82 can further comprise a displaying device, such as a screen or the like, as well as an input device, such as a keyboard or a mouse, for communicating with a (not shown) superordinated warehouse-management system (software and/or hardware).

The operator 84 loads (automatically unloaded) piece goods 82 manually from the working surface 86 into the container 90. The piece goods 62 are transported, preferably individually, (in a hanging manner) via the rail system 92 to the work station 82 by means of the transport bags 10. The unloading station 94 lifts by means of the lifting device 56 thereof the base 32 of the receiving device 18 in a first step to the level of the bottom 22 of the basic structure 16 so that the pushing device 74 can be moved with its pusher 76 through the rear front side 26 into the interior 35 of the basic structure 16 in order to horizontally push out the loaded piece good 62 through the frontal front side 24. Since the working surface 86, which is preferably orientated horizontally, is arranged at the level of the bottom 22 of the transport bag 10, the piece good 62 does not fall—as it typically does in the prior art—but is pushed laterally out of the transport bag 10 "softly".

Figure 6:
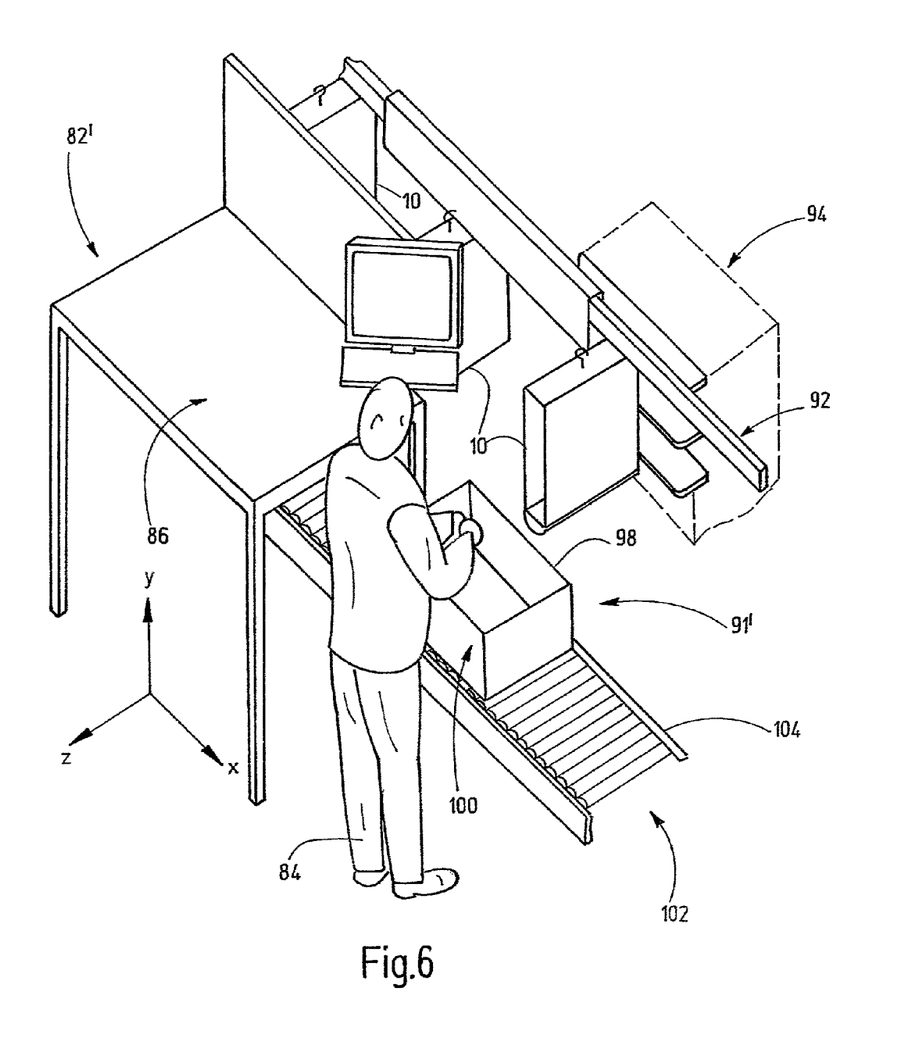
FIG. 6 shows a perspective view of another overhead-conveying system in accordance with the invention.

FIG. 6 shows a perspective view of another overhead-conveying system 80, which in turn comprises a rail system 92 as well as an unloading station 94, wherein the unloading station 94 is merely indicated by means of dashed lines. Instead of pushing the piece goods 62 out of the transport bags 10 onto a working surface 86, the piece goods 62 are pushed at the height of an upper opening edge 98 into an order-load support 88. The order-load support 88 is, in the present case, exemplarily shown in terms of a carton 100 which can be transported via the conveying system 102 to a target location 91'. The conveying system 102 can extend below the working surface 86 of another work station 82', where piece goods 62 can be manipulated, if necessary. In FIG. 6, a roller conveyor 104 is shown exemplarily.

Figures 7A, 7B:
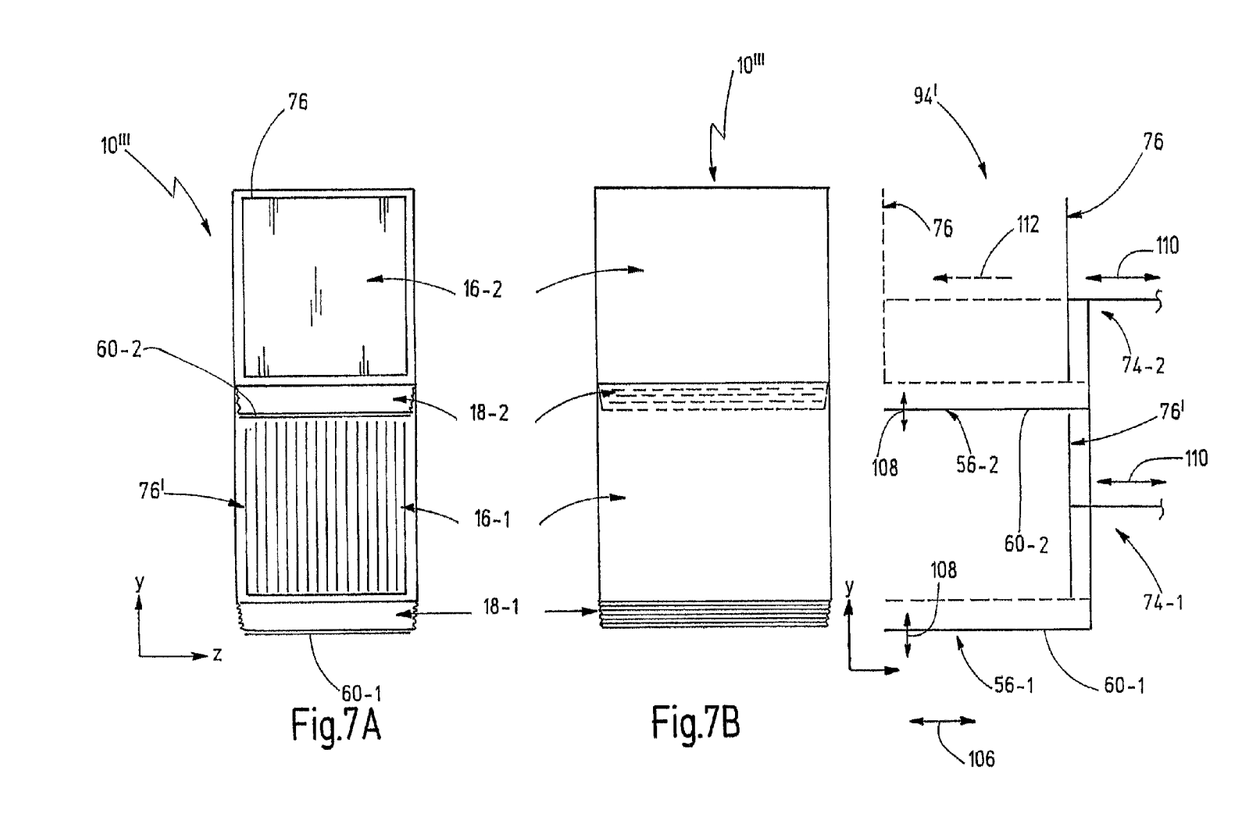
FIGS. 7A and 7B show a front view (FIG. 7A) and a side view of another variation of a transport bag (FIG. 7B) including an unloading station.

With reference to FIGS. 7A and 7B, a front view (FIG. 7A) and a side view (FIG. 7B) of another modified transport bag 10'" including an unloading station 94' is shown.

The transport bag 10'" is formed of several parts and comprises, for example, a first basic structure 16-1 and a second basic structure 16-2, which in the present case are exemplarily formed like cubes. Each of the basic structures 16-1 and 16-2 is in communication with a corresponding receiving device 18-1 and 18-2, respectively, which can be lifted along the vertical direction Y by means of a lifting platform 60-1 and 60-2 to the level of the respective base 22-1 and 22-2, respectively.

For this purpose, the lifting devices 56-1 and 56-2 are moved beneath the bases 32-1 and 32-2 of the receiving devices 18-1 and 18-2 in the transversal direction Z, as indicated in FIG. 7B by means of an auxiliary arrow 106. At the same time, the pushing devices 74-1 and 74-2 can be brought into position in front of the front sides 26 due to these movements 106. It is clear that both the lifting devices 56-1 and 56-2 as well as the pushing devices 74-1 and 74-2 can be configured movable and respectively separated from each other.

The lifting platforms 60-1 and 60-2 can be lifted and lowered, as indicated by means of auxiliary arrows 108. The pushers 76' and 76 of the pushing devices 74-1 and 74-2 can be extended and retracted in the transversal direction Z, as indicated by means of auxiliary arrows 110. The pusher 76, which is shown in the upper part of FIG. 7B, can be extended and retracted in the transversal direction Z relative to the lifting device 56-2. An extended state is indicated in FIG. 7B by means of dashed lines, wherein the pusher 76 has been moved along an auxiliary arrow 112.

The pusher 76 is formed like a plate, but can also be formed, for example, like a comb, as shown for the pusher 76'. With a comb-like or similar embodiments, it is not necessarily required that the rear front side 26 of the basic structure 16 is open. The rear front side 26 can comprise (not shown) slots in this case, through which the pusher 76' reaches.

Figure 8A:
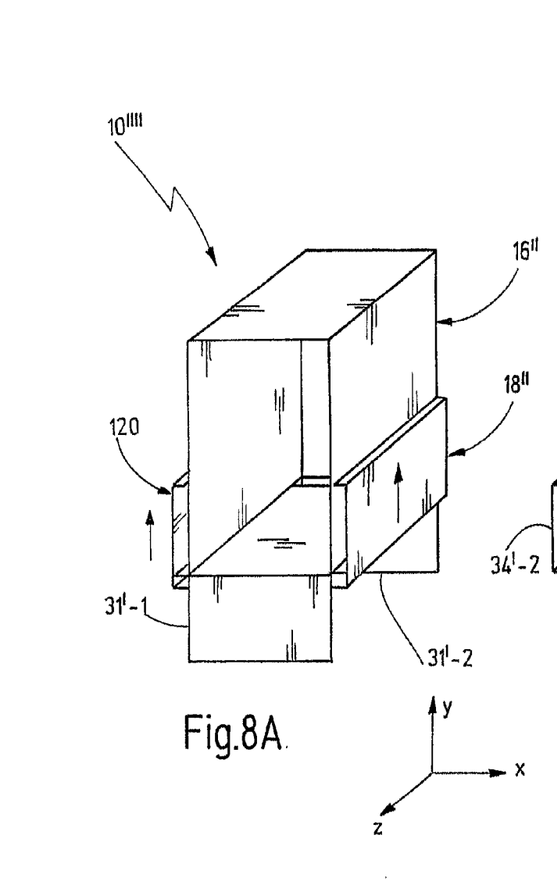
FIG. 8A-8C show another transport bag (FIG. 8A), which is formed of a receiving device (FIG. 8B) having rigid side walls and a basic structure (FIG. 8C), respectively in a perspective illustration.
Figures 8B, 8C:
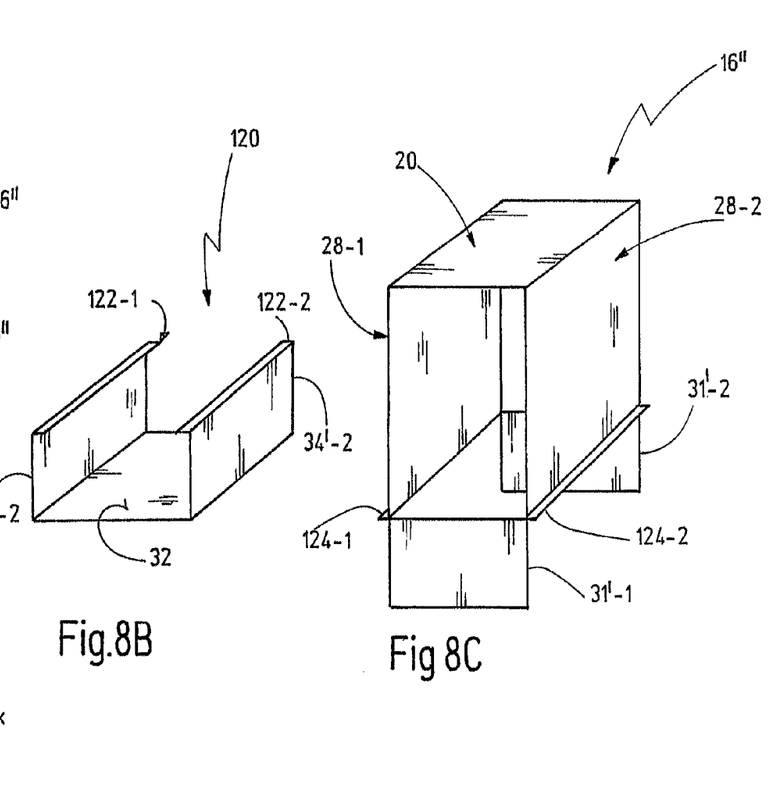

The perspective view of FIGS. 8A to 8C shows another transport bag 10'" (FIG. 8A), which comprises a receiving device 18" (FIG. 8B) having rigid side walls 34' and a basic structure 16" (FIG. 8C).

The transport bag 10'" is shown in FIG. 8A briefly before reaching an unloading position thereof. The receiving device 18" is lifted by means of a (not shown) lifting device 56. The receiving device 18" can be formed as a pushing box 120, which comprises a rigid base 32 and rigid lateral sides 34'-1 and 34'-2. The lateral sides 34' and the base 32 are arranged perpendicularly to each other. The lateral sides 34' respectively comprise a collar 122, which is provided oppositely in parallel to the base 32 at the lateral sides 34' for interacting with a further collar 124, which is provided at the basic structure 16". The additional collars 124-1 and 124-2 extend at the height of the bottom 22 of the basic structure 16" in a horizontal direction at the outer surface of the lateral sides 28-1 and 28-2 and are orientated perpendicularly to the lateral sides 28. In the present case, the front sides 31' are part of the basic structure 16" and extend, in terms of a retaining device, along the front sides 24 and 26 vertically upward. The (closed and rigid) front sides 31' are required by the open front sides 24 and 26. It is clear that the pushing box 120 can also have other shapes. The front sides 31' can also be part of the pushing box 120, wherein the front sides 31' are configured movable relative to the base 32.

Figure 9:
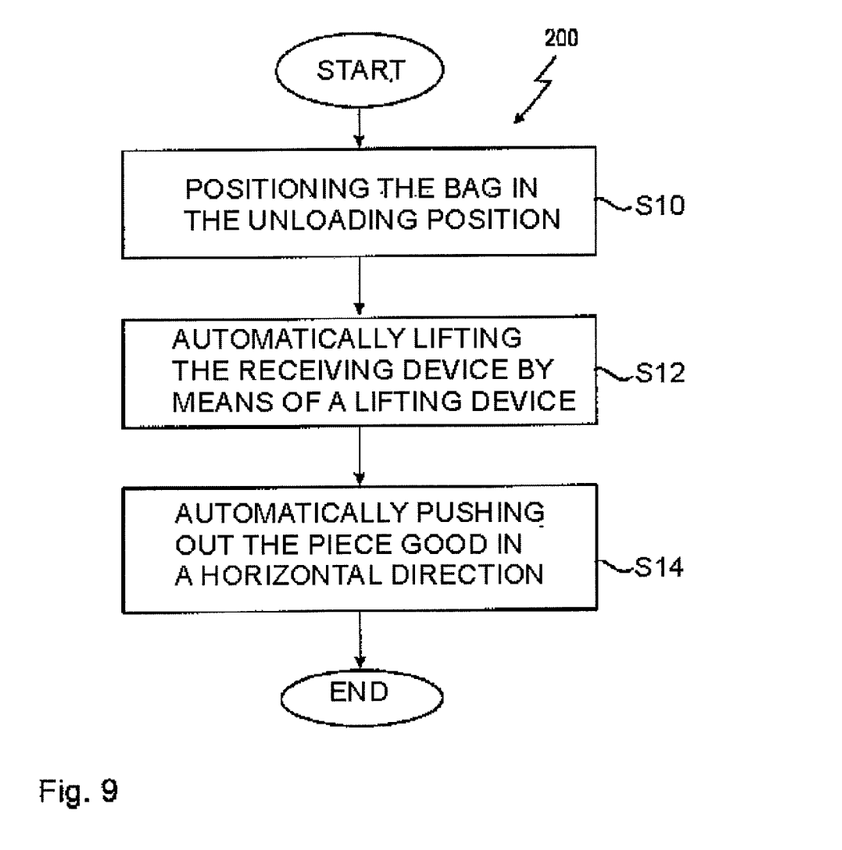
FIG. 9 shows a flow chart of a method for automatically unloading a transport bag.

With reference to FIG. 9, a flow chart of a method 200 for automatically unloading a loaded transport bag 10 is shown.

In a first step S10, the loaded transport bag 10 is positioned in an unloading position. This means that the transport bag 10 is positioned relative to an unloading station 94 such that the pusher 76 of the pushing device 74 can reach into the interior 35 of the basic structure and the lifting device 56 can lift the base 32 to the level of the bottom 22.

Then, in a step S12 the base 32 of the receiving device 18 is automatically lifted by means of the lifting device 56 to the level of the (open) bottom 22 of the basic structure 16. In this manner, the piece good(s) 62 are lifted into the interior 35 of the basic structure 16 and do no longer collide with the retaining device, as it can be realized exemplarily by closed flexible front sides 31 of the receiving device 18 or by the struts 38 of the basic structure 16 in the region of the bottom 22.

If the piece good(s) 62 are lifted to the level of the bottom 22 of the basic structure 16, the piece good(s) 62 can be automatically pushed in the horizontal direction by means of the pusher 76 of the pushing device 74.

Then, the method of the invention ends.

The receiving device is preferably formed such that the cross section of the basic structure 16 remains as unchanged as possible during a change of the transport bag 10 from the transport position (FIG. 2a) to the unloading position (FIG. 2B) for ensuring an interaction with the pushing device 74 without collision.

The transport bag 10 can be configured foldable, as indicated in FIG. 4. In FIG. 4, the transport bag 10" can be folded in the vertical direction Y by rotating the top side 20 of the basic structure 16, which can also be formed in terms of a plastic plate 68, onto the left lateral side 28-1 around a pivotal axis 70, as indicated by means of an auxiliary arrow 72. The right lateral side 28-2 of the basic structure 16' is also folded onto the left lateral side 27-1. In this context, the bottom 22 is rotated into a vertical orientation Y and contacts a lower region of the right lateral side 28-2.

The transport bag 10 is preferably formed in mirror symmetry, so that it can be unloaded in a horizontal direction from both left and right. This facilitates the handling of the transport bags 10 because they do not need to be orientated specifically in relation to the rail system 92.

Further, it is clear that the loaded piece goods 62 can also be pushed horizontally to a (not shown) chute, wherein the chute can have an arbitrary angle relative to a horizontal orientation (plane XZ).

Additionally, it is clear that the term "closed sides" means any structure which prevents the piece good 62 from falling out of the transport bag 10.

An order-load support is to be understood as a load support (such as a palette, tray, container, carton, or the like) which is loaded in accordance with a picking order for being sent to a customer.

The description of the figures above is in general line with regard to the selection of the orientations of the coordinate system with the designations which are typically used in the field of (intra) logistic so that the longitudinal direction is designated by X, the depth by Z, and the (vertical) height by Y.

Further, identical parts and features are provided by the same reference numerals. The disclosures contained in the description can be roughly transferred to identical parts and features having the same reference numerals. Position and orientation indication (such as "above", "below", "lateral", "longitudinal", "transversal", "horizontal", "vertical", or the like) relate to the directly described figure. If the position or orientation is changed, the indications are roughly to be transferred to the new position and orientation.

Therefore, what we claim is:

1. An overhead-conveying system comprising:
   a transport bag including a basic structure as well as a separate receiving device, which is arranged adjacent thereto; wherein the basic structure comprises a top side, a bottom, lateral sides, and front sides; wherein the receiving device comprises a base, a top side, front sides, and lateral sides; wherein unloading of the transport bag is performed through one of the front sides of the basic structure which is open; wherein the bottom of the basic structure is coupled to the top side of the receiving device for defining a receiving space beneath the basic structure, and wherein the bottom of the basic structure is open, wherein the top side of the receiving device is open in a non-loaded state of the transport bag; wherein at least the lateral sides of the basic structure, the lateral sides of the receiving device, and the base of the receiving device are closed; and wherein at least the lateral sides of the receiving device are formed such that the base is liftable into an unloading position of the transport bag, in which the base is lifted into the bottom of the basic structure, wherein the transport bag respectively comprises a retaining device extending in the region of the front sides at least along a transition between the basic structure and the receiving device; and
   an unloading station;
   wherein the unloading station comprises a lifting device and a pushing device;
   wherein the lifting device is configured to lift the base of the receiving device of the transport bag relative to the retaining device, which transport bag is loaded with at least one piece good if the transport bag is located in an unloading position, in a vertical direction into the bottom of the basic structure such that the at least one piece good can be pushed out horizontally by means of the pushing device through one of the front sides of the basic structure of the transport bag; and
   wherein the pushing device comprises a pusher which moves into an interior of the basic structure, where the at least one piece good is located if the base is lifted, through the other front side of the basic structure.

2. The overhead-conveying system of claim 1, wherein the opposite one of the front sides of the basic structure is open.

3. The overhead-conveying system of claim 1, wherein the basic structure is a parallelepiped.

4. The overhead-conveying system of claim 3, wherein the parallelepiped is one of an ashlar and a cube.

5. The overhead-conveying system of claim 1, which is formed such that a cross section of the basic structure along the front sides remains unchanged during a transport process and an unloading process.

6. The overhead-conveying system of claim 1, wherein the front sides of the receiving device are closed.

7. The overhead-conveying system of claim 6, wherein the front sides of the receiving device are flexible.

8. The overhead-conveying system of claim 1, wherein closed sides are covered by a fabric.

9. The overhead-conveying system of claim 1, wherein the base of the receiving device is made of a rigid material.

10. The overhead-conveying system of claim 1, wherein an area of the base is substantially equal an area of the bottom of the basic structure.

11. The overhead-conveying system of claim 1, wherein at least lower edges of the front sides of the basic structure, or upper edges of the front sides of the receiving device, are respectively defined by a strut.

12. The overhead-conveying system of claim 11, wherein the struts are one of wire struts and carbon struts.

13. The overhead-conveying system of claim 11, wherein at least all of the edges of the basic structure are defined by struts being connected to each other, which define a frame.

14. The overhead-conveying system of claim 13, wherein the frame is covered with a material such that the material surrounds, in terms of a length of material, the top side of the basic structure, the lateral sides of the basic structure, the lateral sides of the receiving device, and the base of the receiving device, and such that the material sags in a region of the receiving device in a non-loaded state of the transport bag.

15. The overhead-conveying system of claim 1, wherein the unloading station further comprises at least one fixing device for fixing the transport bag in the unloading position such that the pusher is insertable into the interior of the transport bag without collisions.

16. The overhead-conveying system of claim 1, which further comprises a work station which is arranged directly adjacent to the unloading station and comprises a working surface, which is orientated horizontally and is substantially flush-coupled to the bottom of the transport bag.

17. The overhead-conveying system of claim 1, which further comprises a target location, where an order-load support is positioned such that an upper opening edge of the order-load support is substantially flush-coupled to the bottom of the transport bag.

18. The overhead-conveying system of claim 17, wherein the target location is part of a conveying system, which transports the order-load support.

19. A method for automatically unloading an overhead-conveying transport bag comprising the steps of:
    positioning the transport bag, which is loaded with at least one piece good, in an unloading position, the transport bag including a basic structure, a receiving device beneath the basic structure, and a retaining device extending along a transition between the basic structure and the receiving device, the receiving device having a base supporting the at least one piece good;
    automatically lifting the receiving device of the transport bag by means of a lifting device such that the base of the receiving device is moved upwardly relative to the retaining device and located at a height of an open bottom of the basic structure of the transport bag; and
    automatically pushing the at least one piece good out of the transport bag by means of a pushing device in that a pusher of the pushing device is inserted through a front side of the basic structure into an interior of the basic structure and laterally pushes out the at least one piece good through an oppositely arranged open front side of the basic structure.

* * * * *